May 23, 1972 G. FERRARI 3,664,551
METERING ARRANGEMENT FOR POLYURETHANE ARTICLE
PRODUCING MACHINES
Filed May 26, 1970 3 Sheets-Sheet 1

INVENTOR
GIUSEPPE FERRARI
BY Steinberg & Blake
ATTORNEYS

May 23, 1972

G. FERRARI 3,664,551

METERING ARRANGEMENT FOR POLYURETHANE ARTICLE
PRODUCING MACHINES

Filed May 26, 1970

INVENTOR.
GIUSEPPE FERRARI
BY Steinberg & Blake

May 23, 1972 — G. FERRARI — 3,664,551
METERING ARRANGEMENT FOR POLYURETHANE ARTICLE
PRODUCING MACHINES
Filed May 26, 1970 — 3 Sheets-Sheet 3

INVENTOR.
GIUSEPPE FERRARI
BY Sternberg & Blake
ATTORNEYS

United States Patent Office 3,664,551
Patented May 23, 1972

3,664,551
METERING ARRANGEMENT FOR POLYURE-
THANE ARTICLE PRODUCING MACHINES
Giuseppe Ferrari, Milan, Italy, assignor to S.p.A. Antonio
Ferrari & Figli, Milan, Italy
Filed May 26, 1970, Ser. No. 40,628
Claims priority, application Italy, June 3, 1969,
17,717/69
Int. Cl. B67d 5/46
U.S. Cl. 222—134                          5 Claims

ABSTRACT OF THE DISCLOSURE

An arrangement for supplying metered amounts of different fluids to a station where said fluids are combined, wherein a reciprocating motor drives a rocking lever to which the pistons of metering cylinders are operatively connected, each of the metering cylinders are connected to a common head through a first valve and to a tank through a second valve, the shutting off for the metering is due to the cooperation of members, one of which is mounted along with the others on a drum which can be stepwise rotated, these members mounted on the drum being positioned along guides on the drum periphery.

---

This invention relates to an arrangement for use in machines for producing any type of polyurethane articles by injecting the mixture into a die, wherein this mixture will expand and cure providing the desired article.

In order to obtain polyurethane, it is required to contact two highly viscous fluids, to one of which a catalyst agent is added. To avoid an untimely reaction, this reaction should be initiated at a location as close as possible to the die, where the expansion and curing reaction are to take place.

The weight ratios of the amounts to be contacted will depend upon the desired characteristics for the polyurethane. Moreover, the amount of material introduced into the die has to be proportionated to the cavity to be filled within the die.

The object of the present invention is to provide an arrangement suitably allowing to supply metered amounts of material and to change the mutual ratio of the amounts of ingredients which, together, are to be introduced into the die.

Another object of the invention is to provide an arrangement allowing to change the metered amounts of material in accordance with a cyclic run.

The arrangement according to the invention is essentially characterized by comprising a reciprocating engine causing an angular displacement to an equilizer to which the metering cylinders are connected and inject given amounts of ingredients to the combination location for such ingredients, the ingredients as combined being introduced into the die therefrom.

The invention will be better understood from the following detailed description, given by mere way of example, reference being had to the accompanying drawings, in which.

It is known that polyurethane is formed by contacting two multi-ingredient mixtures, one of which will contain the catalyst. The contact of these mixtures should occur at a location as close as possible to the die in order to avoid the disadvantages which would result where the reaction should be initiated at a location too remote from the die, into which the two combined mixtures are injected to produce the desired technical article, such as a shoe sole. Mixing takes place adjacent the die and is carried out by a mixing screw rotating within a shell. The resulting mixture exits from a nozzle at the end of the shell and reaches the short conduit leading to the die.

As apparent, the mixture amount to be injected into the die will depend on the size of the article to be made. Further in some cases, depending on the characteristics of the final article, it is desirable to vary the quantitative ratio of the two mixtures being involved in the polyurethane forming reaction.

The inventive arrangement, allowing to meter the material to be introduced into the die and to vary the introduced or injected amount and the quantitative ratio of the two mixtures, essentially comprises a double-acting reciprocating engine 1 supplied by a fluid pressure source (not shown) through, for example, a four-way valve (also not shown) enabling to alternately connect one of the engine chambers with the atmosphere and the other with the fluid pressure source.

Figure 5:
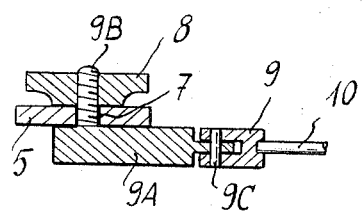
FIG. 5 is a fragmentary sectional view taken along line V—V of FIG. 1.

The cylinder 2 of this reciprocating engine is supported by any known means by the die injecting producing machine for the desired technical articles. A piston (not shown) is slidably mounted within the cylinder 2, its stem 3 being connected through a link 4 to a rocking lever 5 pivoted at 6 to the machine structure (not shown). The rocking lever has two arms, each of which is provided with a longitudinal slot 7. At any location of the slots, the articulated end 9 of a stem 10 (FIG. 5) can be restrained by a screw knob 8. More particularly, a fork is provided at the end of each stem 10, between the legs of this fork the extension of a plate 9A is arranged and carries a threaded pin 9B. The latter passes through the slot 7 and the knob 8 is screwed thereon. A pin 9C pivotally connects fork 9 to plate 9A (FIG. 5). Each of the stems 10 are connected to a piston slidably mounted within a metering cylinder 11. More particularly, since there are two slots 7, there will be two metering cylinders 11 and corresponding members 8, 9 and 10.

At one end the cylinders 11 are pivoted to a cross-piece 13 and 12, the cross-piece being secured to the machine by means of supports 13A.

Figure 1:
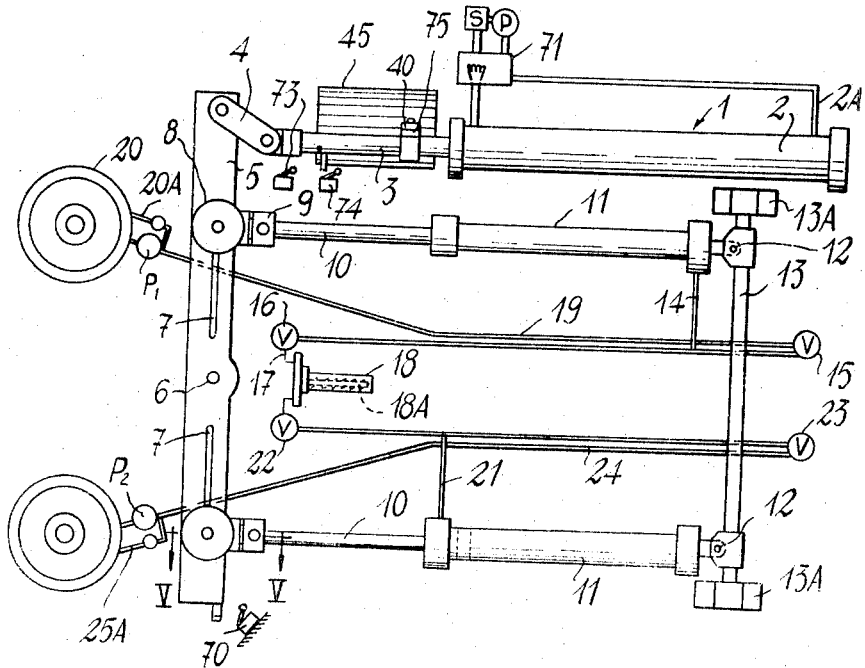
FIG. 1 is a schematic plan view showing the arrangement according to the invention.

One of the cylinders 11, namely that cylinder shown in the top portion of FIG. 1, is connected through a conduit 14 to a two-way electrovalve 15. This conduit 14 is also connected to a two-way electrovalve 16, the outlet 17 of which opens within the mixing head 18 where a usual mixing screw 18A is placed. The head 18 is provided with a nozzle (not shown), serving to feed the material to a die (also not shown). The head is carried by the machine in any known manner.

Valve 15 is connected through a conduit 19 to a vessel 20 containing one of the mixtures. A pump $P_1$ is arranged between the valve 15 and vessel 20, in the drawing there being indicated by 20A the return conduit which, for example, is controlled by a pressure relief valve. This vessel is immersed in an oil trough heated by an electric resistance.

The metering cylinder 11, shown in the bottom portion of FIG. 1, is connected at one of its ends opposite that end of the other cylinder 11 where the conduit 14 is located to a conduit 21 branching into two sections, one of which carries a two-way electrovalve 22 which is connected to the head 18. The other branch terminates in a two-way electrovalve 23. This valve is connected through a conduit 24 to a vessel 25 containing the other mixture which is to take part in the polyurethane forming. Also vessel 25 is connected to a pump, such as $P_2$, which is fitted with a return pipe 25A within, for example, a pressure relief valve is placed, and is water bath immersed in an oil trough heated by electric resistances.

Figure 3:
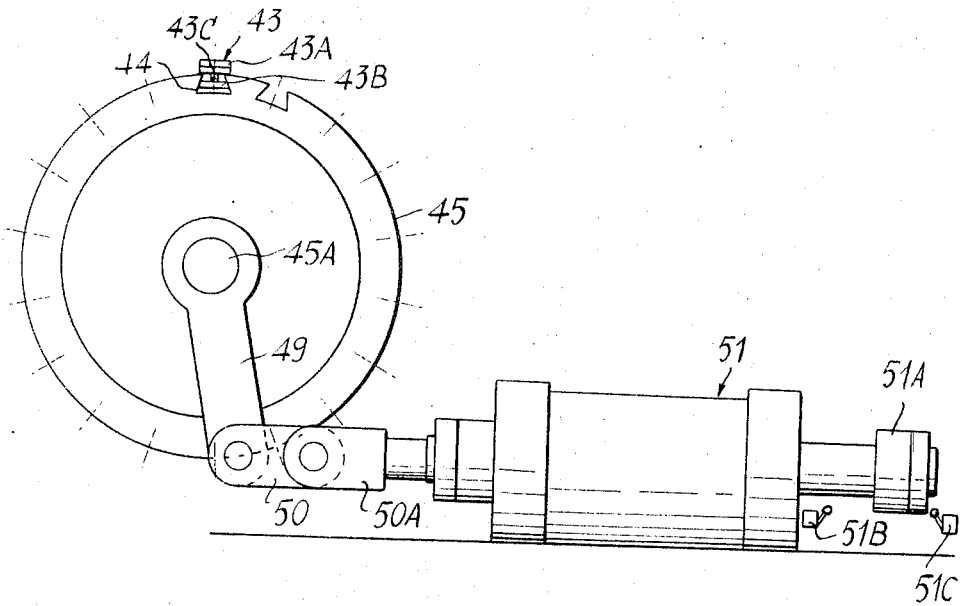
FIG. 3 is partly front and partly sectional view (some parts being broken away) showing the driving means for the device in FIG. 2.
Figure 4:
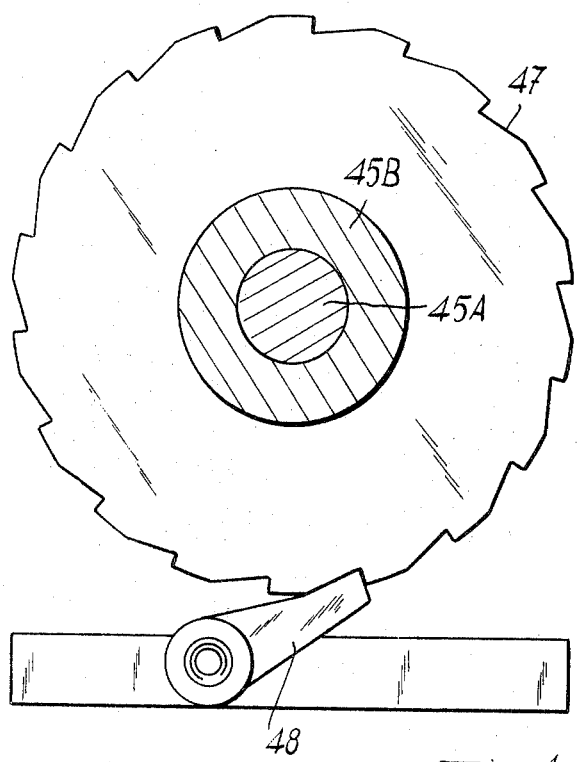
FIG. 4 shows the ratchet at one end of the device in FIG. 2.

The operation of the hitherto described apparatus is as follows:

When pressure oil (as supplied by pump P) is supplied on the right-hand side of cylinder 2 (as seen in FIG. 1) through the conduit 2A and an electromagnetic box 71, the associated stem 3 will be moved to the left and rotatably drive the rocking lever 5. During this stage, the conduit 2B on the other side or end of cylinder 1 (at the left in FIG. 1) is connected through said box 71 with the oil outlet S associated with the delivery side of pump P. As a result of this movement, the two mixtures in vessels 20 and 25 can be transferred to the cylinders 11 through the open valves 15 and 23 by means of the pumps $P_1$ and $P_2$. A limit contact 70 (when contacted by the rocking lever 5) will cause the movement of stem 3 to be reversed, so that the mixtures which have reached the cylinders 11 will be exhausted for some fraction to the vessels 20 and 25 through the conduits 20A and 25A (the valves 16 and 22 being closed). At some point of this back movement, the stem 3, for example by a cam or projection 72 thereof, operates on an electric contact member 73 which provides for closing the valves 15, 23 and opening the valves 16 and 22, whereby the two mixtures are transferred to the head 18. Mixing and injection are effected thereby. As the movement of stem 3 continues, a further electric contact member 40 is operated, as more fully described in the following with reference to FIGS. 2, 3 and 4 of the drawings. The operation on this contact member will cause the closing of valves 16 and 22 and the opening of valves 15 and 23, whereby the residual amounts of mixture in the cylinders 11 are returned to the respective vessels 20 and 25.

Finally, the stem 3 reaches its original or starting position where, by acting with its cam 72 on the limit contact 74, shutting off for example the operating pump P, it will stop and be set for a movement in an inversed direction which, for example, may be started automatically or manually.

Figure 2:
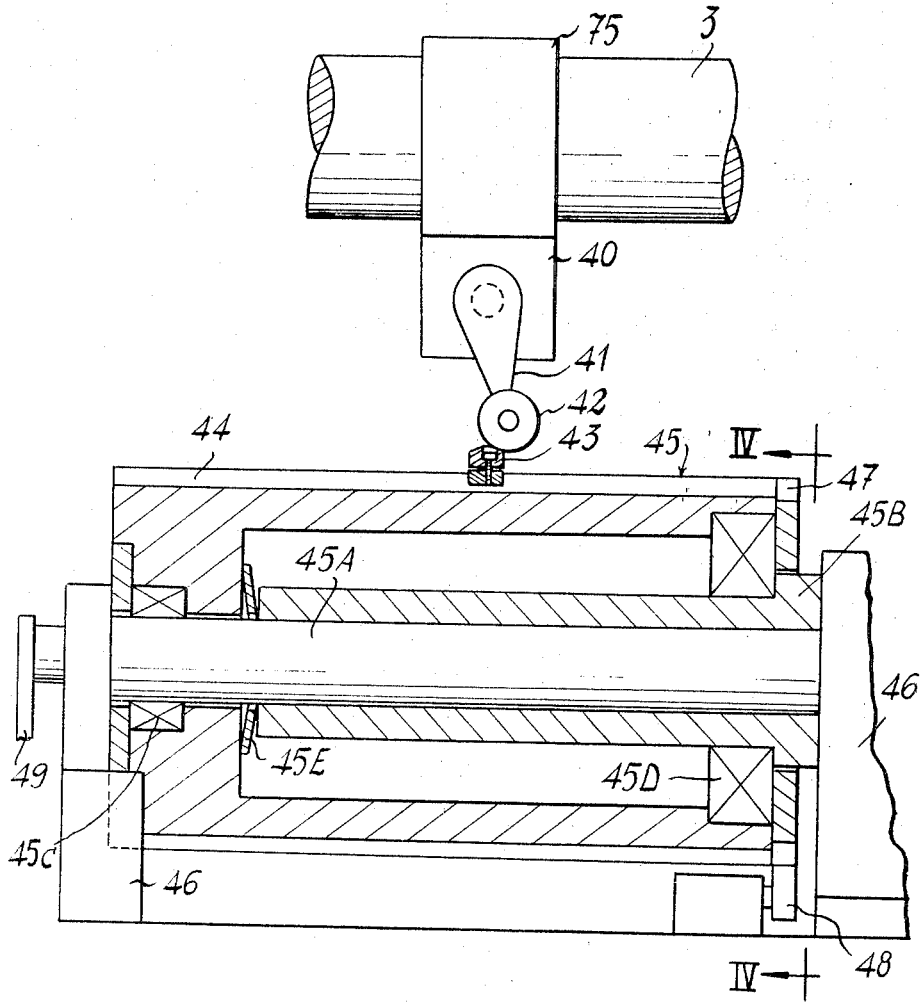
FIG. 2 is a greatly enlarged side side elevational and partly sectional view showing the device for changing the amount of material injected at each injection.

The delivery stop through the head 18 is controlled by said electric contact member 40 which is secured to the stem 3 by means of a supporting arm 75. This contactor 40 is controlled by a sensing lever 41 provided with a roller 42 (FIG. 2).

The roller 42 is designed for being moved by an abutment or cam 43 which is secured within a groove 44 on a rotatable drum 45 during the back movement of the stem 3. Along its periphery, this drum has a series of longitudinal dovetail grooves 44 (FIG. 3) which are evenly spaced apart from one another. An abutment 43 is secured within each of these grooves. Should the amount to be supplied by the head 18 at each operative stroke of stem 3 be constant, all of the cams 43 would be arranged within the associated grooves at the same distance from one of the drum ends. On the contrary, should at each operative stroke different amounts be required to be supplied according to a predetermined cyclic sequence, the cams 43 would be at different distances corresponding to the amount of material to be supplied.

The grooves 44 are of a dovetail cross-section. The abutments are comprised of two portions 43A and 43B which are joined together by a clamping screw 43C. The portion 43A is outside the groove 44 and rests along the outer edges thereof, whereas the portion 43B is dovetail shaped and is located inside the groove. The tightening of the screw enables to clamp the cam at the desired position of the associated groove.

Through rolling bearings 45C,D (FIG. 2) the drum 45 is supported by a shaft 45A and a shell 45B which is attached to said shaft. The shaft and shell are rotatably carried on supports 46 which are secured to the machine frame (not shown). A cup-shaped compressed spring 45E is provided between the end of the shell 45B and an inner flange of the drum, this spring being effective for drivably connecting shaft 45A with drum 45, while allowing, as it will be better understood in the following, a relative movement between the drum and shaft when the latter moves, but the drum is clamped.

At one end, the drum 45 (FIG. 4) has sprocket wheel 47 (acting as a stop wheel) cooperating with a pawl 48 which is loaded by a spring (not shown). At the other end, the shaft 45A is connected with an operating lever 49 which is connected by a piston rod 50 (FIG. 3) to the fork of a stem of a double-acting jack 51. The stroke, that is the angular displacement which can be given to the drum 45 by this arrangement, is the same as the angular spacing between two adjoining grooves 44. An electric pulse applied to a valve member (box), pneumatically connected with the jack 51 and a compressed air supply, enables the drum 45 to be rotated by one stop. This pulse may be applied, for example, by the limit switch 74 limiting the rightward movement of the stem 3, or, where the machine comprises a rotating step plate, by the rotation of said plate or working table of the machine through a cam operating on a contactor.

As a result of this step of drum 55, in the path of roller 42 there is interposed a cam 43 which, for example, is located at a position different from that for the cam of the preceding groove. For the back movement of the jack, a head 51A on the end of its stem may operate on a contactor 51B which will control the box so as to reverse its movement direction. A further contactor 51C, cooperating with the head 51A, will stop the movement of the jack 51, such as by closing an electric valve connecting the compressed air supply to the box. As each of said cams provide for metering the material supplied by the head 18, it will be apparent that by suitable adjusting the cams 43 the metering can be varied according to a predetermined cycle corresponding to the different dies which are brought to cooperate with the head 18. In other terms, the capacity of said dies will correspond to the position of the abutments 43 and thus to the amount of material which will be supplied for each die. Thus, for example, should the machine be used for producing different sizes of soles and the associated dies be placed at a predetermined sequence in front of the head 18, the abutments 43 would be positioned to receive the correct metering for each size of sole to be obtained as desired.

Thus, it will be seen that with the structure of the invention illustrated in the drawings and described above, there is provided a rocking lever means 5 supported by the pivot means 6 for rocking movement about an intermediate portion of the lever means 5, this lever means 5 being rocked by the guide means 1 about the pivot means 6. The pair of metering cylinders 11 have the piston means 10 adjustably connected to the rocking lever means 5 by the adjusting means 8, 9, for each piston means 10, in such a way that through this pair of adjusting means the free ends of the pair of piston means 10 can be adjustably fixed to the rocking lever means 5 at selected distances, respectively, from the pivot means 6. As a result of this construction the pair of piston means 10 move simultaneously but always in opposite directions. In order to obtain simultaneous suction and pressure strokes in the metering cylinders 11 under these conditions, the pair of conduit means 14 and 21 respectively communicate with the metering cylinders 11 in such a way that the conduit means 14 communicates with the upper metering cylinder 11 at an end thereof distant from the rocking lever means 5 while the conduit means 21 communicates with that end of the lower cylinder 11 of FIG. 1 which is nearest to the rocking lever means 5. Therefor, it is possible to achieve simultaneous pressure and suction strokes from both of the metering cylinders 11 under these conditions, with the flow of the material in the conduit means 14 and 21 being controlled by way of the valve means 15, 16 for the conduit means 14 and the valve means 22, 23 for the conduit means 21.

The stem 3 of the drive means 1 forms a control means which reciprocates back and forth along a substantially straight line parallel to the axis of the drum 45. This control means includes the control switch 40 which is carried by the bracket 75 which is fixed to the stem 3. The rotary drum 45 carries a plurality of control stops 43 which are circumferentially distributed about the axis of the drum 45 and capable of being adjustably fixed to the latter respectively along lines parallel to the axis of the drum 45 by way of the adjusting means formed by the clamping structure described above and shown at the top of FIG. 3. The rotary drum 45 is stepped about its axis by the stepping means shown in FIG. 3, and described above, so that successive stops 43 which are circumferentially distributed about the axis of the drum 45 are successively placed in the path of movement of the control means 3, 40. In this way, the control means is actuated at each cycle in such a way as to individually control the displacement of the metering means 11 at each cycle. Because of this possibility of changing the displacement of the metering means 11 at each operating cycle, the pressure-relief return conduits 20A and 25A form a means for automatically returning to the pair of supply means formed by the tanks 20 and 25 the excess material which is not displaced to the head 18.

What I claim is:

1. In an arrangement for supplying metered amounts of different fluids to a station where the fluids are combined, elongated rocking lever means, pivot means supporting said rocking lever means for swinging movement at a location between the ends of said rocking lever means, drive means operatively connected to said rocking lever means for rocking the latter about said pivot means, a pair of metering cylinders having a pair of piston means located on opposite sides of said pivot means, respectively, a pair of adjusting means respectively adjustably connecting said pair of pivot means to said rocking lever means at selected distances from said pivot means, respectively, so that said pair of piston means simultaneously move in opposite directions along strokes the magnitudes of which are determined by the selected distances of the connections of the pair of piston means to the rocking lever means from the pivot means, a pair of supply means for supplying different fluids to the pair of metering cylinders, and a pair of conduit means communicating with said pair of supply means and with the pair of metering cylinders for conducting the different fluids thereto, one of said pair of conduit means communicating with an end region of one metering cylinder which is nearest to said rocking lever means and the other of said pair of conduit means communicating with an end region of the other metering cylinder which is distant from said rocking lever means, so that although the pair of piston means simultaneously reciprocate in opposite directions, they simultaneously carry out synchronous suction strokes and synchronous pressure strokes.

2. The combination of claim 1 and wherein said pair of conduit means also communicate with the station where the fluids are combined, and said pair of conduit means each carrying a pair of valve means to provide for flow of fluids to the metering cylinders during suction strokes and discharge of fluids to said station during pressure strokes.

3. The combination of claim 2 and wherein a pair of return flow means respectively communicate with said pair of conduit means and with said pair of supply means for returning to the latter excess fluid which is not displaced out of the metering cylinders at each operating cycle.

4. The combination of claim 1 and wherein a control means is provided for controlling the angle through which said rocking lever means is rocked by said drive means, said control means including an elongated member which moves back and forth along a substantially straight line, a drum having an axis parallel to said straight line and situated adjacent said elongated member, said drum carrying a plurality of stops which are circumferentially distributed about the axis of said drum, and a plurality of adjusting means respectively coacting with said stops for adjustably fixing the latter to said drum at predetermined locations along lines parallel to the axis of said drum, and stepping means coacting with said drum for circumferentially stepping the latter at each operating cycle of said rocking lever means to successively located the stops carried by said drum in the path of movement of said control means at successive cycles, respectively, said control means including a control member moving along a path in which the stops are successively located by said stepping means, and said control member of said control means when engaging a stop determining the angle through which said rocking lever means is rocked.

5. The combination of claim 4 and wherein said control means includes an elongated stem of said drive means, forming said elongated member of said control means, and participating in the transmission of motion from said drive means to said rocking lever means, said control member being in the form of a switch carried by said elongated stem and said stops being successively located by said stepping means in the path of movement of said switch.

References Cited
UNITED STATES PATENTS

| | | | |
|---|---|---|---|
| 3,499,387 | 3/1970 | Zippel | 417—399 |
| 3,330,917 | 7/1967 | Grundfest | 200—172 AX |
| 2,954,737 | 10/1960 | Hoover | 417—399 |
| 2,946,488 | 7/1960 | Kraft | 222—334 X |
| 3,071,293 | 1/1963 | Lewis-Smith et al. | 222—145 X |

ROBERT B. REEVES, Primary Examiner

D. A. SCHERBEL, Assistant Examiner

U.S. Cl. X.R.

200—172 A; 222—145, 275, 309